April 11, 1961 R. O. LETSCH 2,979,283
FILAMENT HOLDING AND TENSIONING DEVICE
Filed April 16, 1959
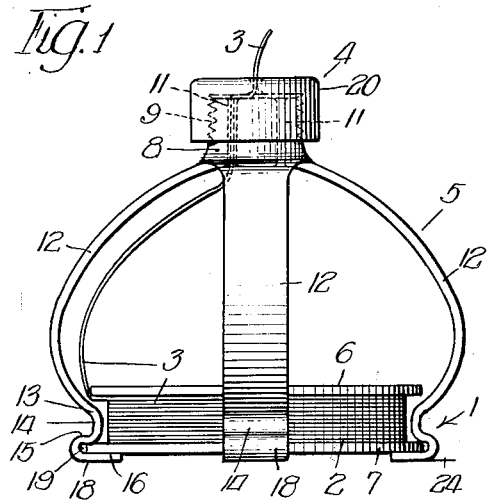
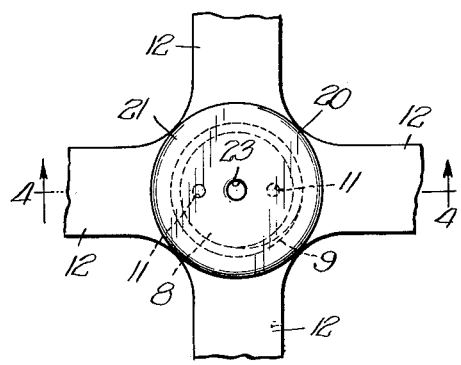
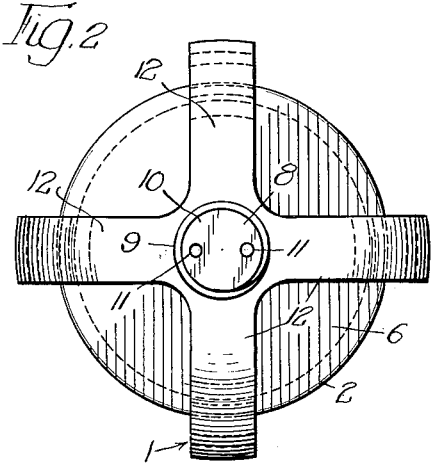
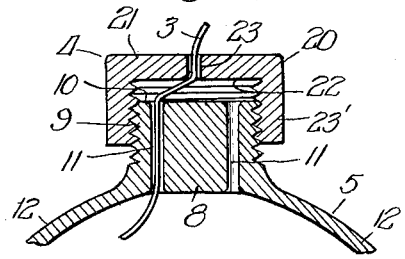
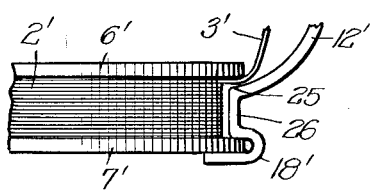
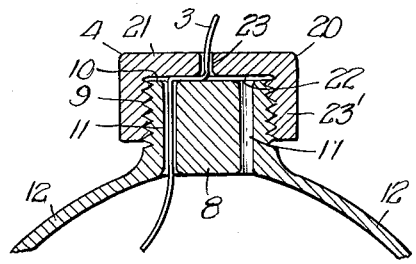
INVENTOR.
Raymond O. Letsch,
BY United States Patent Office 2,979,283
Patented Apr. 11, 1961

2,979,283
FILAMENT HOLDING AND TENSIONING DEVICE
Raymond O. Letsch, 329 Mulberry Ave., Waterloo, Iowa
Filed Apr. 16, 1959, Ser. No. 806,911
7 Claims. (Cl. 242—129.8)

This invention relates to filament holding and tensioning devices, and has particular relation to devices, in general, of the character disclosed and claimed in my copending application, Serial No. 789,042, filed January 26, 1959.

While the device described herein in connection with the drawing is a device for holding a spool of fishing line and for applying tension to the line as it is withdrawn from the spool and wound on a fishing reel, and particularly a spinning reel, it is to be understood that it is not limited to such use, but may be employed for other purposes as suitable and desired.

One of the main objects of the present invention is to provide a device which is adapted to be conveniently applied to a spool, and particularly a flanged spool of fishing line, or other filament, such as string, cord, yarn, thread, wire or the like.

Another object is to provide a device with which, when applied to the spool, the line or filament comes off the spool over the edge thereof, and passes between tensioning members for applying the desired back-tension to the line, or filament as it passes, for example, to the reel and is wound thereon.

Another object is to provide a device wherein the means for applying the same to the spool comprises spaced resilient arms having free ends with re-entrant portions thereon for snapping over a flange of the spool to grip the flange and secure the device to the spool, and which may be conveniently released to remove the device from the spool.

Another object is to provide a device wherein the spaced arms, or other connecting part between the tensioning means and the means for engaging the spool are disposed outside the generally conical or bell-like path of the filament as it passes from the spool to the tensioning means and are contoured or arranged to confine the filament at this position as it is withdrawn from the spool.

Another object is to provide a structure which will more closely confine the filament between spaced flanges on the spool as it is withdrawn from the spool.

Further objects and advantages of the invention will be apparent from the following detailed description taken in connection with the accompanying drawing, it being understood that the invention is limited only within the scope of the appended claims and not to the particular embodiment selected for illustration.

In the drawing:

Fig. 1 is a side elevational view of a device embodying the present invention showing the same applied to a spool of fishing line or other filament;

Fig. 2 is a top plan view of the device shown in Fig. 1, with the adjustable cap removed;

Fig. 3 is a fragmentary top plan view with the cap in place;

Fig. 4 is a fragmentary sectional view on enlarged scale taken along the line 4—4 of Fig. 3 with the adjustable cap in place and showing the cap adjusted to apply a relatively slight back-tension to the filament;

Fig. 5 is a fragmentary sectional view similar to Fig. 4, but showing the cap adjusted to fixedly clamp the filament between the ends walls of the cap and the cooperating tensioning member; and Fig. 6 is a fragmentary view showing a modification in which the resilient arm adjacent to the re-entrant portion is contoured into close proximity to the spool to confine the filament between spaced flanges on the spool.

Referring now to the drawing, particularly to Figs. 1–6, the device shown in these figures comprises means designated at 1 for gripping or holding a spool 2 for withdrawal of the filament 3 therefrom, tension means designated generally at 4 for applying the desired back-tension to the filament 3 as it is withdrawn from the spool, and connecting part designated generally at 5 connecting the spool gripping and holding means 1 to he tension means 4.

The spool 2 is shown as of the construction on which fishing line, for example, is commonly supplied. It has the usual cylinder provided on opposite ends with flanges 6 and 7 which are thus spaced apart with the line or filament 3 disposed therebetween.

The tension means 4 comprises a relatively thick and cylindrical tension member 8, provided on its peripheral surface with an external screw thread 9. The member 8 has an end surface 10 and one or more apertures 11 opening through the member 8 and the end surface 10. Two such apertures 11 are shown in the drawing, but this may vary. These apertures 11 are parallel with and laterally offset from, or eccentrically disposed with respect to the axis of the member 8. In the drawing, the apertures 11 are shown disposed at diametrically opposite positions at opposite sides of the axis of the member 8.

A plurality of equally spaced and resilient arms or legs 12 are formed, for example, integral with the member 8 at their upper ends, as the device is shown in Fig. 1. These arms 12 are generally bowed outwardly and away from the tension member 8. The arms 12 constitute the connecting part which connects the spool gripping and holding means to the tension member 8.

Each resilient arm 12 at its free end is contoured inwardly at 13, then longitudinally at 14 and outwardly at 15, and is flanged inwardly at 16 to form re-entrant portions designated in their entirety at 18 for springing into engagement with the flange 7 of the spool 2 with the flange 7 thus engaged in the grooves 19. The re-entrant portions 18 constitute the means for holding and gripping the spool 2.

The cap member 20 has an internal screw thread which engages the screw thread 9 for adjustable threaded engagement of the cap on the tension member 8. The cap 20 has a relatively thick end wall 21 provided with an end surface 22 opposing the end surface 10 and an aperture 23 opening through the end wall 21 and surface 22.

Cap 20 also has an integral annular side wall 23' which surrounds the adjacent portion of the member 8 when the cap is in position screw threaded thereon. The aperture 23 is disposed coincident with the axis of rotation of the cap 20, or at least is disposed laterally of the apertures 11.

The apertures 11 and 23 are preferably of at least somewhat greater diameter than the filament 3, so that the walls of the apertures will not, per se, impose significant back-tension on the filament as it is withdrawn from the spool. Thus, the device may be adjusted to impose substantially no drag on the filament if that should be desired, and passing of the filament through the apertures is facilitated.

The showing of more than one, and specifically two apertures is to permit two filaments to be drawn from the common outlet 23 as more fully disclosed in the hereinbefore identified co-pending application. When the device is used for applying tension to a fishing line, exemplified by the filament 3, this line may be passed through either one of the apertures 11.

In use, the device is applied to the spool 3 of fishing line by spreading the free ends of the resilient arms 12 and inserting the spool 2 between the spaced ends, as shown in Fig. 1. As the arms 12 are freed, the re-entrant portions 18 snap over the flange 7 of the spool, and grip this flange to secure the device to the spool. The spool is released for removal from the device by merely spreading the resilient arms 12.

With the spool of line in place, as shown in Fig. 1, the line 13 is withdrawn from the spool over the edge of the flange 6 and is passed through one of the apertures 11, then laterally between the end surfaces 10 and 22 and out through the aperture 23. Outwardly of the aperture 23 the end of the line 3 is attached, for example, to the fishing reel (not shown). The reel is then turned or cranked, and withdraws the line 3 from the spool 2 and winds the same upon the reel. The holding and tensioning device may be placed, for example, on the floor as shown at 24 in Fig. 1 at this time, or otherwise held or supported as desired.

As the line 3 is withdrawn over the edge of the flange 6, it assumes a generally conical or bell-like path in its passage to the aperture 11 as shown in Fig. 1. The bowed arms 12 are disposed outside this generally conical path of the filament and confine the filament along this path.

The amount of back-tension applied to the filament is adjusted by screwing the cap 20 onto or from the tension member 8. By screwing the cap tightly onto the member 8 the laterally directed portion of the filament may be fixedly clamped between the surfaces 22 and 10, as shown in Fig. 5. By unscrewing the cap 20 from the member 8, the filament is permitted progressively greater freedom of movement in its passage from the aperture 11 to the aperture 23, thereby progressively relieving the back-tension applied to the filament. In Fig. 4 the cap 20 is shown unscrewed an amount so that only a slight degree of back-tension is applied to the filament as it is withdrawn from the device. Thus, by mere screw threaded adjustment of the cap 20, substantially any desired degree of back-tension may be applied to the filament.

In Fig. 6 the resilient arm 12' adjacent to the re-entrant portion 18' is contoured at 25 and 26 into close proximity to the spool 2' to confine the filament 3' between the spaced flanges 6' and 7' of the spool 2'.

The embodiment of the invention shown in the drawing is for illustrative purposes only, and it is to be especially understood that said drawing and the accompanying specification are not to be construed as the limits or scope of the invention, reference being had to the appended claims for that purpose.

I claim:

1. A filament holding and tensioning device comprising, in combination, means for gripping over and holding the periphery of a first flange on a spool of filament for withdrawal of the filament from the spool in generally conical path over the edge of an opposite second flange spaced on said spool from said first flange, tension means cooperable with the filament upon withdrawal from the spool, and connecting means resiliently connecting said gripping and holding means to said tension means and resiliently holding said gripping and holding means in gripping and holding engagement with said first flange on said spool.

2. A filament holding and tensioning device according to claim 1 wherein the tension means has apertures positioned in proximity to an extension of the axis of the spool through which the filament is adapted to pass, said connecting means being disposed outside the generally conical path of the filament and contoured to confine the filament along said path.

3. A filament holding and tensioning device according to claim 1, wherein the connecting means has a portion disposed between the spaced flanges on the spool to confine the filament between said spaced flanges.

4. A filament holding and tensioning device comprising, in combination, a tensioning member having an end surface and an aperture opening through said end surface, a plurality of spaced resilient arms on said tensioning member and generally bowed outwardly and away from said member, said arms having re-entrant portions at their free ends for springing into engagement with a flange on a spool of filament to grip and hold said spool for withdrawal of the filament over the edge of the spool and through the aperture in said tensioning member, and a cap having screw threaded engagement with said tensioning member and an end surface opposed to the end surface of said tensioning member, said cap having an aperture eccentric to the aperture in said tensioning member for passage of the filament therethrough with a lateral offset in the filament between said end surfaces, whereby by adjustment of said cap on said tensioning member varying degrees of back-tension may be applied on the filament.

5. A filament holding and tensioning device according to claim 4 wherein the apertures in the tensioning member and cap are positioned in proximity to an extension of the axis of the spool, whereby the filament assumes a generally conical path as it passes from the spool to said tensioning member, said resilient arms being disposed outside said generally conical path of the filament and contoured to confine the filament along said path.

6. A filament holding and tensioning device according to claim 4 wherein the re-entrant portions and the free ends of the resilient arms are adapted for springing into engagement with one of a pair of spaced flanges on the spool, and said arms have portions for positioning in proximity to the spool to confine the filament between said spaced flanges.

7. A filament holding and tensioning device comprising, in combination, spring arms having re-entrant portions for gripping over and holding a first flange on a spool of filament for withdrawal of the filament from the spool in a generally conical path over the edge of an opposite second flange spaced on the spool from said first flange, a first tensioning member carried by said arms and a second tensioning member adjustable on said first tensioning member for imposing on the filament varying degrees of back-tension as the filament is withdrawn from the spool.

References Cited in the file of this patent

UNITED STATES PATENTS

| | | |
|---|---|---|
| 567,743 | Griffith | Sept. 15, 1896 |
| 1,214,172 | Kinney | Jan. 30, 1917 |
| 1,943,542 | McDonough | Jan. 16, 1934 |
| 2,414,169 | Raymond | Jan. 14, 1947 |